June 8, 1926.
S. C. REPPE
DISPENSING DEVICE
Filed Feb. 1, 1923
1,588,051
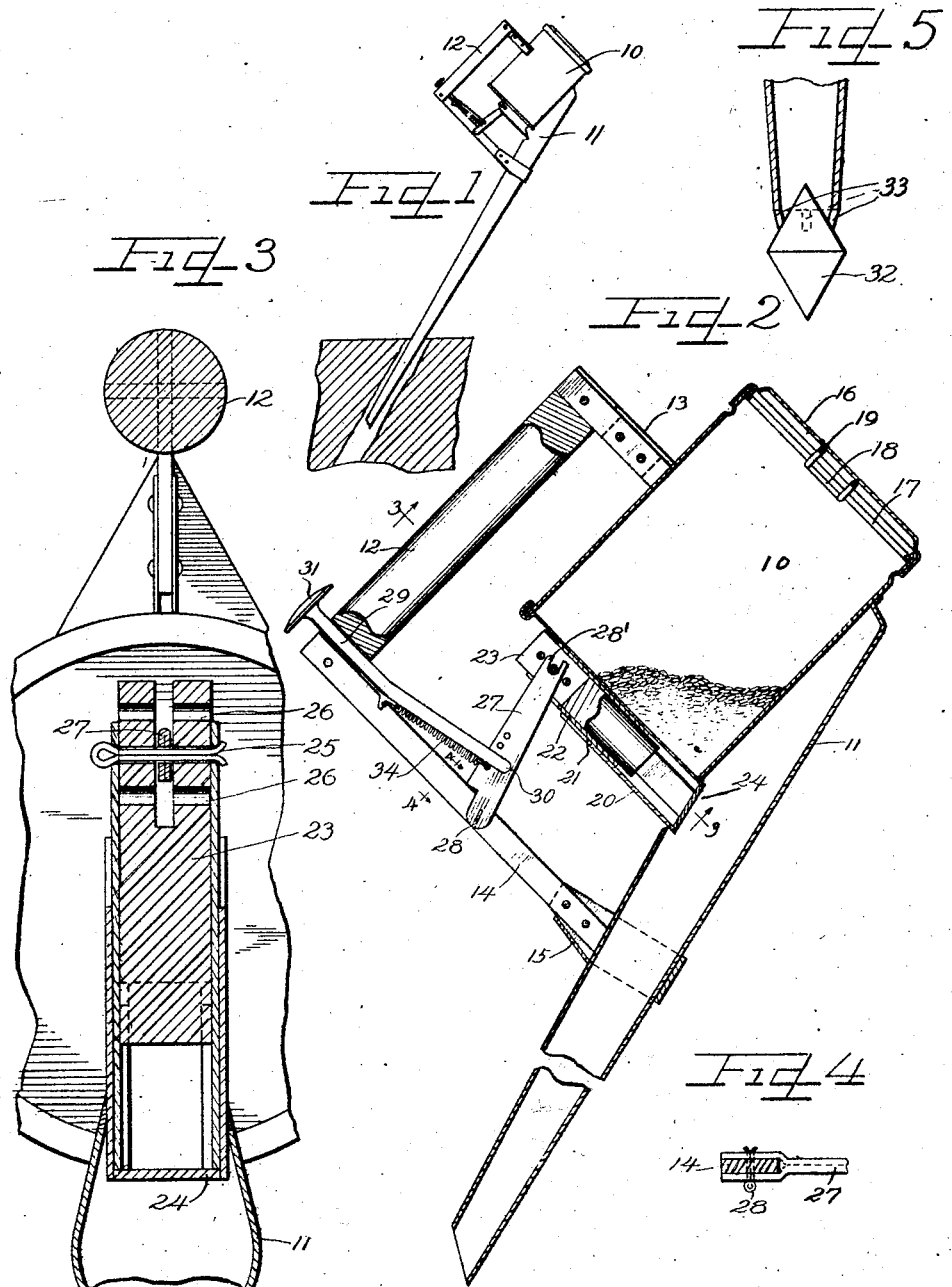

Patented June 8, 1926.

1,588,051

UNITED STATES PATENT OFFICE.

SEVER C. REPPE, OF CHICAGO, ILLINOIS.

DISPENSING DEVICE.

Application filed February 1, 1923. Serial No. 616,325.

This invention relates to a dispensing device adapted to deliver predetermined quantities of material when desired.

One of the principal objects of the invention is to provide a device by which material may be inserted into the apertures or receptacles, or into the earth in predetermined quantities.

A further object of the invention is to provide means for delivering predetermined amounts of grain which has been impregnated with a suitable poison, into the holes of gophers, rats, snakes and other vermin.

A further object of the invention is to provide means whereby a given quantity of grain may be inserted in the ground.

A further object of the invention is to provide improved means for manually delivering predetermined quantities of material.

Further and important objects and advantages of the invention will appear from the description, of a preferred form, of the invention shown in the accompanying drawings.

In the drawings:

Figure 1 is a side elevation of the device in the act of inserting a charge of grain into a hole in the ground.

Figure 2 is a side elevation, partly in section, of the improved device.

Figure 3 is a section on the line 3—3 of Figure 2.

Figure 4 is a section on the line 4—4 of Figure 2.

Figure 5 shows a modification of the end of the chute or spout adapted for use in sowing seed.

The apparatus includes a container 10, to one side of which is attached a chute or spout 11, through which the contents of the container are to be discharged. On the side opposite to the spout 11 is arranged a handle 12 secured to the container at its lower end by means of a bracket 13. At its upper end the handle is connected to the spout by means of a member 14 and bracket 15.

The container is open at its lower end and a detachable bottom 16 is provided. In order to allow a ready attachment and detachment of the bottom whenever it is desired to fill the container, a wire 17 is secured to the inside of the can having two diametrically opposite portions projecting inwardly, adapted to engage with the projecting end 18 of a wire 19 secured to the inside of the bottom 16. By turning the bottom the end portions 18 may be brought into and out of engagement with the inwardly projecting parts of the wire 17.

On top of the container is located a tube 20 open at each end, within which reciprocates a plunger 21, for the purpose of transferring a predetermined amount of grain from the container to the spout. This plunger may be conveniently formed of a brass tube 22 with a core of wood 23 arranged therein. The end of the tube 22 adjacent the spout is closed by a plate 24, while the underside of the tube behind this plate 24 is cut away so that when device is inverted with the plunger in the position shown in Figure 2, grain from the container may flow into the space in this tube between the end of the wooden core 23 and the plate 24. Then when the plunger is moved towards the spout, the grain can fall into the latter through an aperture in the tube opposite to that which allowed the grain to enter the tube. The plunger is then moved in the opposite direction by spring 34, in order that the tube 22 may receive a further charge of grain. It will be observed that the plate 24 serves to prevent any grain from passing from the container to the spout without a reciprocation of the plunger 21.

The plunger 21 is reciprocated by means of an arm 27, which is pivotally connected by a cotter pin 28 to the member 14. At its lower end this arm 27 is provided with a fork 28' for engagement with a cotter pin 25 which passes through apertures in the tube 22 and any one of a series of holes 26 in the wooden core 23, (Figure 3). The tube 20 is slotted to allow for the movement of the cotter pin 25.

This arm 27 is normally drawn away from the spout 11 by means of a spring 34. In order, therefore, that the arm and the plunger connected thereto may be reciprocated, a rod 29 is provided, which is pivotally connected at 30 to the arm 27 and passes through an aperture in the handle. At its outer end this rod is provided with a button 31, which may be depressed by the thumb in order to move the arm and the plunger in opposition to the spring 34.

In the form of construction shown in Figures 1 to 4, the spout has a clear unobstructed end which is satisfactory for inserting material into a hole which has been previously made. Where, however, a hole has to be made, for example, when the device is to be used for planting seed, it is desirable to provide at the end of the spout some means for making a hole. This may conveniently be accomplished by providing a member 32 of diamond shape cross section, which may be secured to the lower end of the spout by four projecting arms 33, between which are spaces through which the seed may fall into the hole made by the member 32.

The operation is as follows:

The end of the spout is inserted into the gopher or other hole, as shown in Figure 1, and then the rod 29 is depressed by pressure of the thumb upon the part 31. This causes the arm and plunger 21 to move towards the spout and thereby allow the material contained in the tube 22 to fall into the spout. The pressure of the thumb is then relieved, whereupon the spring 34 extracts the plunger and allows another charge of grain to enter the tube 22. The device is then ready to discharge a further quantity of grain either into the same hole or into another hole.

I am aware that many changes may be made and numerous details of construction varied through a wide range without departing from the principles of this invention, and I therefore do not purpose limiting the patent granted hereon otherwise than necessitated by the prior art.

I claim as my invention:

1. A device of the kind described comprising a cylindrical flat bottom container, a spout connected to one side of the container and projecting above the top thereof and manually operated means for transferring a predetermined quantity of granular material from the container into the spout when the device is inverted.

2. A device of the kind described comprising a container, a removable bottom by which the container may be filled, a discharge chute attached to one side of the container, a tube attached to the top of the container communicating at one end with the chute, and at one side with the container, a plunger reciprocable in the said tube having a cutaway portion adapted in one position of the plunger to receive material from the container and in another position to discharge such material into the chute, a handle for the container on the side opposite the chute, a member extending from the upper end of the handle to the chute above the container, an arm pivoted to said member, a pin and slot connection between said arm and said plunger, a spring adapted to move said arm and plunger towards the handle, a rod passing through the handle pivotally connected to said arm and a button on said rod whereby said plunger may be reciprocated manually against the action of said spring.

3. A device of the kind described comprising a container, a removable bottom by which the container may be filled, a discharge chute attached to one side of the container, a tube attached to the top of the container communicating at one end with the chute, and at one side with the container, a plunger reciprocable in said tube having a cutaway portion adapted in one position of the plunger to receive material from the container and in another lower position to discharge such material into the chute when the device is inverted and means for reciprocating the plunger.

In testimony whereof I have hereunto subscribed my name.

SEVER C. REPPE.